United States Patent [19]

Fukami et al.

[11] 4,212,959
[45] Jul. 15, 1980

[54] HEAT RESISTANT RESIN COMPOSITION

[75] Inventors: Akira Fukami; Hiroyuki Nakajima, both of Amagasaki, Japan

[73] Assignee: Mitsubishi Denki Kabushiki Kaisha, Tokyo, Japan

[21] Appl. No.: 904,266

[22] Filed: May 9, 1978

[51] Int. Cl.² .............................................. C08L 63/00
[52] U.S. Cl. .................................... 525/524; 525/421; 525/422; 525/530; 525/930; 528/113; 528/322
[58] Field of Search ............ 260/830 P, 830 TW, 836, 260/837 R; 525/930, 421, 422, 524, 530; 528/113, 322

[56] References Cited

U.S. PATENT DOCUMENTS

| 3,177,090 | 4/1965 | Bayes | 260/830 R |
|---|---|---|---|
| 3,424,707 | 1/1969 | Schaufelberger | 260/830 TW |
| 3,637,901 | 1/1972 | Bargain | 260/830 P |
| 3,839,493 | 10/1974 | Balme | 260/830 P |
| 3,875,113 | 4/1975 | Lefebvre | 260/830 P |
| 3,880,811 | 4/1975 | Kaupp | 260/830 P |
| 3,883,486 | 5/1975 | Bargain | 260/830 P |
| 3,978,152 | 8/1976 | Gruffaz | 260/830 P |
| 3,985,928 | 10/1976 | Watanabe | 260/830 P |

FOREIGN PATENT DOCUMENTS

| 2123638 | 11/1971 | Fed. Rep. of Germany. | |
|---|---|---|---|
| 48-19238 | 6/1973 | Japan. | |
| 50-78697 | 6/1975 | Japan | 260/830 P |
| 50-13497 | 12/1975 | Japan | 260/830 P |

OTHER PUBLICATIONS

T. F. Saunders: Pol imide epoxy flame retardant resin blend. IBM Technical Disclosure Bulletin vol. 17, No. 2, p. 387 Jul. 1974.

Primary Examiner—Paul Lieberman
Attorney, Agent, or Firm—Oblon, Fisher, Spivak, McClelland & Maier

[57] ABSTRACT

A heat resistant resin composition comprises 100 wt. parts of a mixture [I] and 0 to 10 wt. parts of a phenoxy resin [II] wherein the mixture [I] comprises 80 to 5 wt. parts of (a) a mixture of 0 to 95 wt. parts of the first maleimide compound obtained by reacting an aromatic amine with maleic anhydride and/or a maleic anhydride derivative and 100 to 5 wt. parts of the second maleimide obtained by reacting an aromatic amine with a cyclic acid anhydride having no unsaturated double bond and maleic anhydride and/or a maleic anhydride derivative and 20 to 95 wt. parts of (b) and epoxy resin.

13 Claims, No Drawings

HEAT RESISTANT RESIN COMPOSITION

BACKGROUND OF THE INVENTION:

In general, non-solvent type varnish does not contain a solvent whereby all of the components can be effectively used without loss and no volatile matter is vaporized to be desirable from the viewpoint of hygienic safety.

Accordingly, the non-solvent type varnishes have been mainly used instead of the conventional solvent type varnishes.

Unsaturated polyester resins and epoxy-modified resins have been used in the non-solvent type varnishes. These resins are easily deteriorated at high temperature whereby the resins are not durable for a long time, disadvantageously.

For example, epoxy compounds have been used by hardening with a hardener such as amino compounds and acid anhydrides as resins having suitable electrical characteristics, dimensional stability and chemical resistance in various fields however heat resistance of the epoxy resin is not satisfactory.

On the other hand, it has been known that maleimide compounds are polymerized to produce resins having high heat resistance. For example, it has been known to produce three dimensional polyimides by polymerizing only N,N'-di-substituted maleimide under heating in French Pat. No. 1,455,514.

However, the three dimensional polyimides have high cross linkages whereby cracks easily form upon heating and cooling. Accordingly, these polyimides are not suitable as resins for casting, disadvantageously.

Moreover, it has been proposed to obtain resins having high heat resistance by combining the epoxy resin with maleimide compound in Japanese Patent Publication No. 12600/1974. The resin obtained by the combination of the epoxy resin and maleimide compound have high heat resistance, however, the varnishes having the resin having disadvantages to precipitate the resin by maintaining for a long time because of low solubility of the maleimide compound. Moreover, the heat shrinkage of the resin in the hardening step is high whereby the adhesion on surface of a coil is not suitable in an immersing step or a casting step for a large coil and the resins are peeled off or cracked to cause a trouble in a practical used.

SUMMARY OF THE INVENTION:

It is an object of the present invention to provide a resin composition having excellent heat resistant and mechanical characteristics which has no disadvantage mentioned above.

The foregoing object of the present invention has been attained by providing a heat resistant resin composition which comprises 100 wt. parts of a mixture [I] and 0 to 10 wt. parts of a phenoxy resin [II] wherein the mixture [I] comprises 80 to 5 wt. parts of (a) a mixture of 0 to 95 wt. parts of the first maleimide compound obtained by reacting an aromatic amine with maleic anhydride and/or a maleic anhydride derivative and 100 to 5 wt. parts of the second maleimide obtained by reacting an aromatic amine with a cyclic acid anhydride having no unsaturated double bond and maleic anhydride and/or a maleic anhydride derivative and 20 to 95 wt. parts of (b) an epoxy compound.

DETAILED DESCRIPTION OF THE PREFERRED EMBODIMENTS:

The second maleimide compounds used in the present invention should be mixed imides which have a low melting point resulted by an eutectic effect and are easily soluble and have high thermal stability. The unsaturated degree in one molecule can be controlled by selecting a molar ratio of the cyclic acid anhydride having an unsaturated double bond to the cyclic acid anhydride having no unsaturated double bond.

Accordingly, the resin compositions of the present invention are stable without any formation of a precipitate.

Even though the imide content is increased to give higher heat resistance, the baked resin having low shrinkage and excellent mechanical properties can be obtained by decreasing the ratio of the imide having an unsaturated bond.

When a phenoxy resin having a large molecular weight is incorporated in the resin composition of the present invention, the phenoxy resin component having a large molecular weight and high flexibility is dispersed in the wet works of the baked net work of the maleimide compound and the baked net work of the epoxy compound whereby the shrinkage in the baking is decreased and the flexibility is imparted to the baked resin and the adhesiveness is improved because of free hydroxy group of the phenoxy resin.

The resin compositions of the present invention have excellent adhesiveness impregnating property and casting property, and further have low shrinkage and give the baked products having excellent flexibility and heat resistance. Accordingly, the resin compositions can be used in various fields such as non-solvent type varnishes for impregnating coils, resins for casting and resins for laminating especially impregnation type varnishes for insulation of rotary electric machines.

The first maleimides used in the present invention include N-substituted compounds having the formula

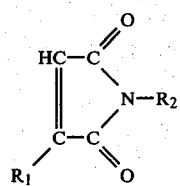

wherein $R_1$ represents hydrogen atom or an alkyl group, $R_2$ represents a monovalent organic group such as an alkyl, an aryl and an aralkyl group and a halogen substituted group thereof.

Suitable maleimides include N-methylmaleimide, N-ethylmaleimide, N-propylmaleimide, N-butylmaleimide, N-hexylmaleimide, N-octylmaleimide, N-dodecylmaleimide, N-phenylmaleimide, N-p-tolylmaleimide, N-m-tolylmaleimide, N-α-naphthylmaleimide, N-benzylmaleimide and the mixture thereof.

The first maleimides also include N,N'-disubstituted maleimides having the formula

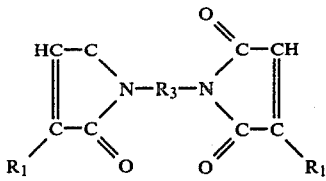

wherein $R_1$ represents hydrogen atom or an alkyl group and $R_3$ represents a divalent organic group such as an alkylene, an allylene or an aralkylene group.

Suitable maleimides include N,N'-(methylene-di-p-phenylene) dimaleimide, N,N'-(oxy-di-p-phenylene) diamaleimide, N,N'-m-phenylenedimaleimide, N,N'-p-phenylenedimaleimide, N,N'-2,4-tolylenedimaleimide, N,N'-2,6-tolylenedimaleimide, N,N'-m-xylenedimaleimide, N,N'-p-xylenedimaleimide, N,N'-oxydipropylenedimaleimide, ethylenedioxybis-N-propylmaleimide, oxybis-N-ethylmaleimide, N,N'-ethylenedimaleimide, N,N'-trimethylenedimaleimide, N,N'-tetramethylenedimaleimide, N,N'-hexamethylenedimaleimide, N,N'-dodecamethylenedimaleimide and mixture thereof.

The first maleimides also include polymaleimides having the formula

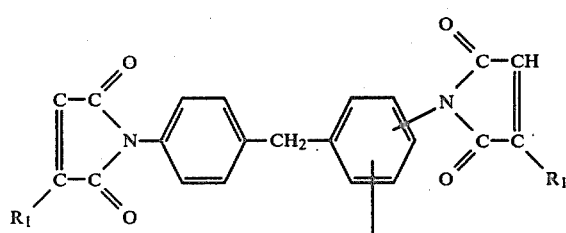

wherein $R_1$ represents hydrogen atom or an alkyl group and n represents 0.5 to 5 as an average.

The aromatic amines used for forming the second maleimides used in the present invention include

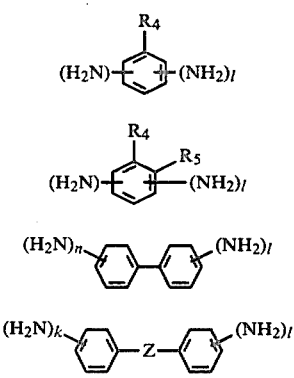

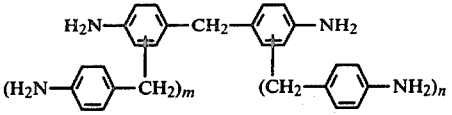

wherein $R_4$ and $R_5$ respectively represent an alkyl group, chlorine atom or bromine atom and Z represents an alkylene group, —O—, —NH—, —S—, —SO$_2$—, —COO—, —CONH—, —OCOO—, or —COOCO— and k+l is an integer of 1 to 4 and m and n respectively represent 0 or an integer of 1 to 5.

In the formula (V), when m or n is an integer of 2 or more, the aromatic amines include the compounds having p-anilinomethyl substituent group whose hydrogen on the ring is further substituted with p-anilinomethyl group as the complex substituents and a mixture thereof.

Suitable aromatic amines include aniline, o-toluidine, p-toluidine, chloroaniline, bromoaniline, aminochlorotoluene, aminoxylene, aminoethylbenzene, aminodiphenylether, aminodiphenylsulfone, aminodiphenylester, aminobenzanilide, aminodiphenylsulfide diaminodiphenylether, diaminodiphenylmethane, diaminodiphenylester, diaminobenzanilide, diaminodiphenylsulfone and diaminodiphenylsulfide.

The poly (phenylmethylene) polyamine having the formula (V) is preferably a mixture of the polyamines having an average total of m+n of 0.5 to 5.

These aromatic mines are used a single compound or a mixture thereof.

The maleic anhydride or maleic anhydride derivatives have the formula

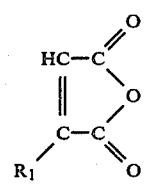

wherein $R_1$ represents hydrogen atom or an alkyl group and which are, for example, maleic anhydride and citraconic anhydride.

The cyclic cid anhydrides having no unsaturated double bond which are used for producing the second maleimide compound have the formula

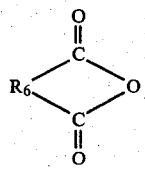

wherein R₆ represents

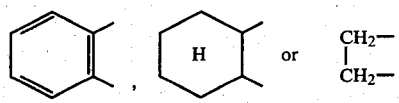

and which are, for example, succinic anhydride, phthalic anhydride, hexahydrophthalic anhydride and glutaric anhydride.

The second maleimide compounds can be obtained by introducing a maleimide group or the other imide group into the amino group of the aromatic amine.

The amount of the maleic anhydride, or the derivative thereof and the cyclic acid anhydride having non-unsaturated double bond is usually corresponding to the amino group of the aromatic amine, because the acid anhydride stoichiometrically reacts with the amino group of the aromatic amine.

The ratio of the maleic anhydride or a derivative thereof to the cyclic acid anhydride having non-unsaturated double bond is depending upon the purpose of the second maleimide compound and it is usually in a range of 2:8 to 8:2 by weight.

It is preferable to include 0.5 to 3.0 preferably 0.8 to 2.0 of maleimido group as average in one molecule of the second maleimide. The ratio is selected depending upon the number of the amino groups of the aromatic amine.

When the number of the maleimido group of the second maleimide compound is less than 0.5, the melting point of the imide compound is higher. When said maleimide compound is used as a vinyl monomer which is polymerizable, the components in the dispersion which are not reacted are too much whereby the electrical and mechanical properties may be inferior.

When the number of the maleimide group of the second maleimide compound is more than 3.0, the crosslinkage density of the baked resin is too high whereby the baked resin may be brittle.

The ratio of the first maleimide compound to the second maleimide compound is not critical and the composition comprises usually 0 to 95 wt. part of the first maleimide compound and 100 to 5 wt. parts of the second maleimide compound.

The heat resistance and the mechanical characteristics of the object baked resin can be improved by increasing the ratio of the second maleimide compound. Accordingly, the content of the second maleimide can be selected as desired.

The first maleimide can be commercially available ones which are low cost. When the economical problem is important, the content of the first maleimide is increased.

Even though the amount of the second maleimide compound is less than 5 wt. parts, the effect of the second maleimide compound can be expected. Even though 100 wt. parts of the first maleimide compound is used, the baked resin having superior characteristics can be obtained in comparison with the conventional ones.

The epoxy resins used in the present invention include the following compounds.

It is possible to add suitable amount of an epoxy compound having one cyclic or chained epoxy group in the molecule.

The epoxy compounds having a cyclic epoxy group are compounds hving 1,2-epoxy group such as epoxidized diolefins, dienes, cyclic dienes and diolefinic unsaturated carboxylic acid esters.

The commercially available epoxy compounds include Chissonox 221, 201, 206, 269 and 289 (manufactured by Chisso K.K.) and Araldite CY-179, 178, 181 185 and 175 (manufactured by Chiba-Geigy).

The compounds having a chained epoxy group include polyglycidyl ethers and polyglycidyl esters.

The polyglycidyl ethers can be produced by a condensation of epichlorohydrin or β-methyl epichlorohydrin with an aliphatic diol, a polyhydric alcohol, a bisphenol, phenol-novolak or cresol-novolak in an alkaline condensation.

The commercially available epoxy compounds include Epikote 826, 828, 834, 1001 and 1004 (manufactured by Shell Co.) and DEN 431 and 438 (manufactured by Dow Chemical Co.) Araldite CY-250 and 255 (Ciba-Geigy).

The polyglycidyl esters can be produced by reacting a dicarboxylic acid with epichlorohydrin or β-methyl epichlorohydrin in an alkaline condition.

The commercially available epoxy compounds include Araldite CY-183 (Ciba-Geigy), Epikote 190 and 191 (Shell Co.), Lekutherm X-100 (Bayer) Epikone 200 and 499 (Dainippon Ink Color).

Suitable monoepoxides which are used to incorporate in said epoxy compound include phenylglycidyl ether, allylglycidyl ether, cresylglycidyl ether, butylglycidyl ether, styreneoxide, p-butylphenolglycidyl ether, cyclohexenevinyl monoxide, glycidyl methacrylate, dipentenemonoxide, octyleneoxide, etc.

A diepoxide can be also incorporated.

Suitble diepoxide diluents include butadieneoxide, dimethylmethanedioxide, diglycidyl ether, butanediol diglycidyl ether, diethyleneglycol diglycidyl ether, vinylcyclohexene dioxide, divinylbenzenedioxide, bis(2,3-epoxycyclopental) ether, 3,4-epoxy-6-methylcyclohexyl methyl-3,4-epoxymethylcyclohexene carboxylate, resorcineglycidyl ether, 2-glycidylphenylglycidyl ether, 2,6-diglycidylphenylglycidyl ether.

The hardeners for the epoxy compound used in the present invention include acid anhydrides having the formula

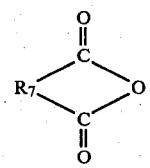

wherein R₇ represents

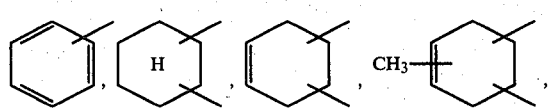

-continued

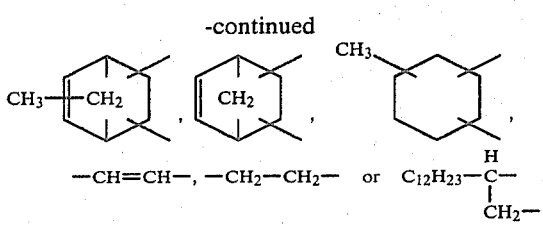

$-CH=CH-$, $-CH_2-CH_2-$ or $C_{12}H_{23}-\overset{\displaystyle H}{\underset{\displaystyle CH_2-}{C-}}$.

The amount of the hardener to the epoxy resin is not critical and can be selected as desired.

It is preferable to combine 20 to 95 wt. parts of the epoxy resin including the hardener with 80 to 5 wt. parts of the mixture of the first maleimide compound and the second maleimide compound.

When the content of the mixture of the first and second male imide compounds is less than 5 wt. parts, the heat resistance of the baked resin is not enough, whereas when it is more than is more than 80 wt. parts, the heat resistance is enough high but the mechanical characteristics are inferior.

The phenoxy resins having the unit formula

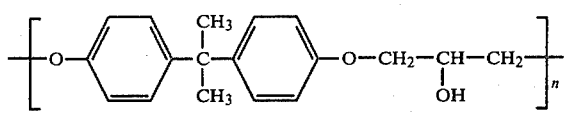

which have a molecular weight of about 10,000 to 60,000 are preferably used in the present invention.

The phenoxy resin is incorporated in an amount of 0 to 10 wt. parts, preferably 0.5 to 10 wt. parts per 100 wt. parts of the resin composition of the first and second maleimide compounds and the epoxy resin.

When the phenoxy resin is incorporated, the resulting baked resin has improved flexibility and cracking resistance. When it is used as the impregnation type varnish, the impregnating property is improved.

Although the resin composition having excellent characteristics can be obtained by incorporating less than 0.5 wt. part of the phenoxy resin, but the effect of the phenoxy resin is not clearly found.

The minimum amount of the phenoxy resin is considered from the purpose of the application.

On the other hand, when the content of the phenoxy resin is more than 10 wt. parts, a viscosity of the composition is too high whereby the processability in the casting and impregnating opertion is inferior.

The heat resistant resin compositions of the present invention are in a non-solvent type and form the baked resins having significant heat resistance and significant adhesiveness to the other material and low shrinkage and high flexibility and high electric insulation.

The resin compositions can be used as impregnation type varnishes for electric parts, resins for casting, resins for lamination and other various applications.

The other additives such as fillers, pigments, etc. can be optionally incorporated.

Certain examples are provided for purposes of illustration only and are not intended to be limiting in any manner.

In the examples, the second maleimide compounds M-2A, B, C and D were produced by the conventional method using the components shown in the following Table-1.

Table 1

|  | M-2A | M-2B | M-2C | M-2D (mole) |
|---|---|---|---|---|
| 4,4'-diaminodiphenylmethane | 1.0 | 1.0 | 1.0 | — |
| 4,4'-diaminodiphenylether | — | 1.0 | — | 0.5 |
| aniline | 0.2 | — | — | 0.5 |
| poly(phenylmethylene) polyamine (formula V n = 1.0) (m = 0) | — | — | 1.0 | 1.0 |
| maleic anhydride | 1.1 | 2.5 | 3.0 | 3.2 |
| phthalic anhydride | — | — | 1.0 | — |
| hexahydrophthalic anhydride | 1.1 | 1.5 | — | 0.8 |

EXAMPLE 1:

To 48 wt. parts of the epoxy compound (Epikote 828) was added 17 wt. parts of the second maleimide M-2A shown in Table-1 and it was completely dissolved at 140° C. and the mixture was cooled to 60° C. Then, 38 wt. parts of methyl tetrahydrophthalic anhydride and 1 wt. part of DMP-30 were added and the mixture was cooled to the room temperature to obtain a resin composition. The resin composition was a varnish being stable at room temperature which did not form any precipitate under leaving for 50 hours. A viscosity of the composition measured by Brookfield type viscometer was 2.0 poise at 60° C. A flexural strength and a flexural modulus of the baked product measured by Instron universal tester were respectively 13.5 Kg/mm$^2$ at 25° C. and 290 Kg/mm$^2$ at 25° C. The baked resin had a weight loss of 4.8% at 240° C. for 250 hours and a heat distortion temperature of 135° C. and an adhesive strength of 14.0 Kg at 25° C.

EXAMPLES 2 TO 4:

In accordance with the process of Example 1, the varnishes having compositions shown in Table 2 were prepared and the tests of the baked products were carried out.

The results are shown in Table 2.

Table 2

|  | Example | | |
|---|---|---|---|
|  | 2 | 3 | 4 |
| Epoxy compound: | | | |
| Epikote 828 | | | 25 |
| Epikote 834 | 57 | | 28 |
| Chissonox 221 | | 15 | |
| Cresylglycidyl ether | 5 | | |
| Methyl tetrahydrophthalic anhydride | 35 | 10 | 36 |
| DMP-30 | 1 | 1 | |
| Second maleimide compound: | | | |
| M-2A | | 80 | |
| M-2B | | | 80 |
| M-2C | 10 | | |
| Viscosity (70° C.: poise) | 2.0 | 10.0 | 5.5 |
| Flexural strength (25° C.: Kg/mm$^2$) | 14.0 | 18.0 | 16.0 |
| Flexural modulus (25° C.: Kg/mm$^2$) | 280.0 | 330.0 | 295 |
| Heat distortion temp. (°C.) | 140 | 165.0 | 155 |
| Adhesive strength (25° C.: Kg) | 15.5 | 16.5 | 16.0 |
| Weight loss (%) (240° C. 250 hours) | 4.8 | 2.4 | 3.2 |

EXAMPLE 5:

To 47 wt.parts of the epoxy compound (Epikote 828) was added 2 wt.parts of the phenoxy resin (M.W. 30,000) and it was completely dissolved at 150° to 160° C. and then 20 wt.parts of the second maleimide compound (M-2A) was dissolved in the mixture at 120° to 130° C. and the mixture was cooled to 60° C. Then, 37 wt.parts of methyl tetrahydrophthalic acid and 1 wt.part of zinc octanate were added and the mixture was cooled to the room temperature to obtain a resin composition.

The resin composition was stable without forming any precipitate under leaving at the room temperature for 50 hours.

EXAMPLES 6 TO 9:

In accordance with the process of Example 5, the varnishes having the compositions shown in Table 3 were prepared and the tests of the baked products were carried out.

The results are shown in Table 3.

REFERENCES 1 AND 2:

In accordance with the process of Example 1, the varnishes having the compositions shown in Table 3 were prepared and the tests of the baked products were carried out. The results are shown in Table-3.

Table 3

|  | Example |  |  |  | Reference |  |
|---|---|---|---|---|---|---|
|  | 6 | 7 | 8 | 9 | 1 | 2 |
| Epoxy compound: | | | | | | |
| Epikote 815 |  | 20 | 20 | 47 | | |
| Epikote 828 | 27 | | | | 47 | 100 |
| Epikote 834 | | | | | | |
| Epikote 1001 | | | | | | |
| CY-175 | 20 | | | | | |
| DEN-431 | | | 10 | | | |
| Chissonox 221 | | 20 | | | | |
| Butylglycidyl ether | | | | 2 | | |
| Methyl nadic anhydride | | 20 | 20 | 38 | | |
| Methyl tetrahydro- phthalic anhydride | 38 | | | | 38 | 85 |
| Zinc octylate | | 5 | 1 | 3 | | |
| Benzyl methylamine | 2 | | | | 1 | 1 |
| N-phenylmaleimide | | | | | 2 | |
| N,N'-(methylenediamine- p-phenylene)dimaleimide | | | | | 15 | |
| Second maleimide: | | | | | | |
| M-2A | 15 | | | 10 | | |
| M-2B | | 20 | | | | |
| M-2C | | | 100 | | | |
| M-2D | | | | | | |
| Phenoxy resin M.W. 25,000 | | 3 | | | | |
| Phenoxy resin M.W. 30,000 | 1 | | 1 | | | |
| Viscosity (70° C.: poise) | 1.0 | 3.0 | 8.0 | 10.0 | 0.6 | — |
| Flexural strength (25° C.: Kg/mm²) | 14.8 | 13.6 | 15.0 | 14.0 | 13.5 | 14.3 |
| Flexural modulus of elasticity (25° C.: Kg/mm²) | 280 | 270 | 285 | 250 | 365 | 300 |
| Heat distortio temp. (°C.) | 140 | 125 | 145 | 120 | 155 | 125 |
| Adhesive strength (25° C.: Kg) | 16.5 | 15.8 | 16.0 | 16.5 | 10.0 | 15.0 |
| Weight loss (%) (240° C. 250 hours) | 8.0 | 6.5 | 2.4 | 8.2 | 8.0 | 20.0 |

EXAMPLE 10:

To 47 wt.parts of the epoxy comound (Epikote 828) was added 2 wt.parts of the phenoxy resin (M.W. 30,000) and it was completely dissolved at 150° to 160° C., and then 2 wt.parts of the second maleimide compound (M-2A) and 13 wt.parts of the first maleimide of N,N'-(methylenedi-p-phenylene) dimaleimide were dissolved in the mixture at 120° to 130° C. and then, cooled to 60° C. and 37 wt.parts of methylhexahydrophthalic anhydride and 2 wt.parts of zinc octylate were added and the mixture was cooled to the room temperature to obtain a resin composition.

The resin composition was stable without forming any precipitate under leaving at the room temperature for 50 hours.

The resin composition had a viscosity of 1.0 poise at 70° C.

The baked product had a flexural strength of 13.5 Kg/mm² at 25° C. and a flexural modulus of 330 Kg/mm² at 25° C. and a weight loss of 6.5% at 240° C. for 250 hours.

EXAMPLE 11:

To 47 wt.parts of the epoxy compound (Epikote 828) was added 1 wt.part of the phenoxy resin (M.W. 30,000) and it was completely dissolved at 150° to 160° C. and then, 10 wt.parts of the second maleimide compound (M-2B) and 5 wt.parts of the first maleimide compound of N,N'-(methylene-di-p-phenylene) dimaleimide were dissolved and cooled to 60° C. and 38 wt.parts of methyl tetrahydrophthalic anhydride and 1 wt.part of zinc octylate were added and the mixture was cooled to the room temperature to obtain a resin composition. The resin composition was stable without forming any precipitate under leaving at the room temperature for 50 hours.

The resin composition had a viscosity of 0.8 poise at 70° C.

The baked product had a flexural strength of 13.0 Kg/mm² at 25° C. and a weight loss of 7.0% at 240° C. for 250 hours.

What is claimed is:

1. A heat resistant resin composition, comprising:
   (a) 80 to 5 parts by weight of a mixture of (i) 0 to 95 parts by weight of a first maleimide compound selected from the group consisting of

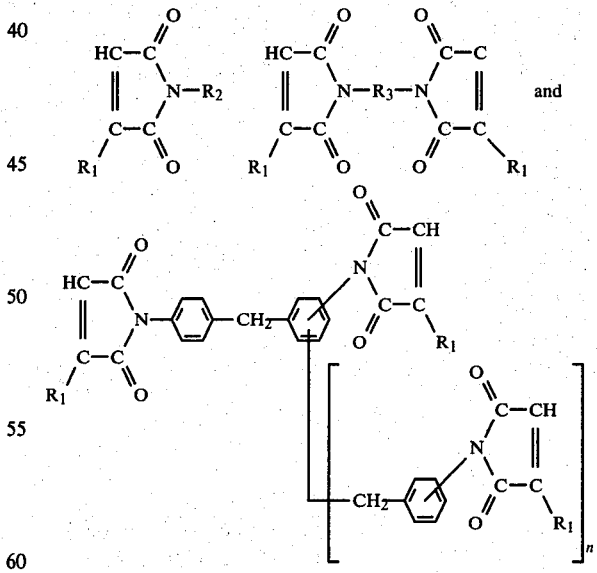

wherein $R_1$ is alkyl, $R_2$ is a monovalent organic group, $R_3$ is a divalent organic group and n is an average of 0.5 to 5 and (ii) 100 to 5 parts by weight of a second maleimide compound formed by reacting an aromatic amine selected from the group consisting of aniline, o-toluidine, p-toluidine, chloroaniline, bromoaniline, aminochlorotoluene, aminoxylene, aminoethylbenzene, aminodiphenylether, aminodiphenylsulfone, aminodiphenylester, aminodiphenylsulfide,

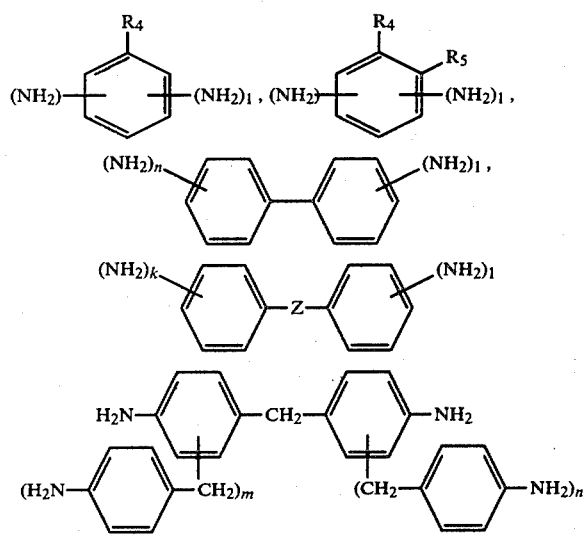

wherein $R_4$ and $R_5$ represent alkyl, chlorine or bromine; Z is alkylene, —O—, —NH—, —S—, —SO$_2$—, —COO—, —CONH—, —OCOO— or —COOCO—; $k+l$ represents an integer of 1 to 4 and m and n each represents 0 or an integer of 1 to 5 and mixtures thereof with a maleic anhydride compound of the formula:

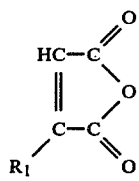

wherein $R_1$ is hydrogen or alkyl and a cyclic anhydride compound of the formula:

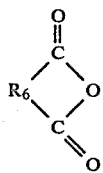

wherein $R_6$ is

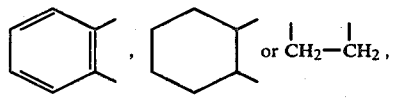

the weight ratio of said maleic anhydride compound to said cyclic anhydride compound ranging from 2:8 to 8:2 and the amounts of said aromatic amine and maleic anhydride compound and cyclic anhydride being such that the total amount of anhydride is the stoichiometric amount necessary to react with the amino groups of said aromatic amine; and (b) 20 to 95 parts by weight of a diepoxy compound.

2. The heat resistant resin composition according to claim 1, which further comprises from 0 to 10 parts by weight of a phenoxy resin incorporated in 100 parts by weight of the composition of claim 10.

3. The heat resistant resin composition according to claim 1 or 2 wherein said aromatic amine is a mixture of an aromatic monoamine and an aromatic polyamine.

4. The heat resistant resin composition according to claim 1 or 2 wherein $R_2$ represents an alkyl, aryl, aralkyl or haloalkyl, haloaryl or haloaralkyl group.

5. The heat resistant resin composition according to claim 1 or 2 wherein $R_3$ represents an alkylene, arylene or aralkylene group.

6. The heat resistant resin composition according to claim 1 or 2, wherein the second maleimide compound has average 0.5 to 3.0 maleimido group per molecule.

7. The heat resistant resin composition according to claim 1 or 2, wherein the cyclic anhydride is succinic anhydride, phthalic anhydride, hexahydrophthalic anhydride or glutaric anhydride.

8. The heat resistant resin composition according to claim 1, wherein said diepoxy compound is butadieneoxide, dimethylmethanedioxide, diglycidylether, butanedioldiglycidylether, diethyleneglycoldiglycidylether, vinylcyclohexenedioxide, divinylbenzenedioxide, bis(2,3-epoxycyclopental)ether, 3,4-epoxy-6-methylcyclohexylmethyl-3,4-epoxymethylcyclohexenecarboxylate, resorcineglycidylether, 2-glycidylphenylglycidylether or 2,6-diglycidylphenylglycidylether.

9. The heat resistant resin composition according to claim 2, wherein said phenoxy resin has the formula:

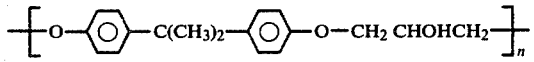

and which has a molecular weight ranging from 10,000 to 60,000.

10. The heat resistant resin composition according to claim 1, which further comprises a hardener of the formula:

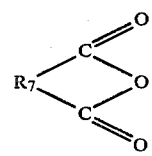

wherein $R_7$ is

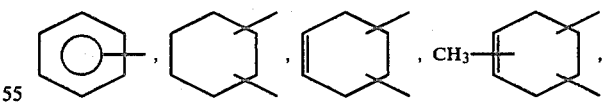

11. The heat resistant resin composition according to claim 1, wherein said diepoxy compound is a compound having a 1,2-epoxy group selected from the group consisting of epoxidized diolefins, dienes, cyclic dienes and diolefinic unsaturated carboxylic acid esters or a chained epoxy group selected from the group consisting of polyglycidylethers and polyglycidylesters.

12. The heat resistant resin composition according to claim 11, wherein said polyglycidylether is a polyglycidylether produced by condensing epichlorohydrin or β-methyl epichlorohydrin with an aliphatic diol, a polyhydric alcohol, a bis-phenol, or a phenol-novolak or a cresol-novolak resin prepared under alkaline condensation conditions.

13. The heat resistant resin composition according to claim 11, wherein said polyglycidylester is a polyglycidylester produced by reacting a dicarboxylic acid with epichlorohydrin or β-methyl epichlorohydrin under alkaline reaction conditions.

* * * * *